March 24, 1925. 1,530,716
G. W. DOERR
DOUGH MIXER
Filed May 7, 1924
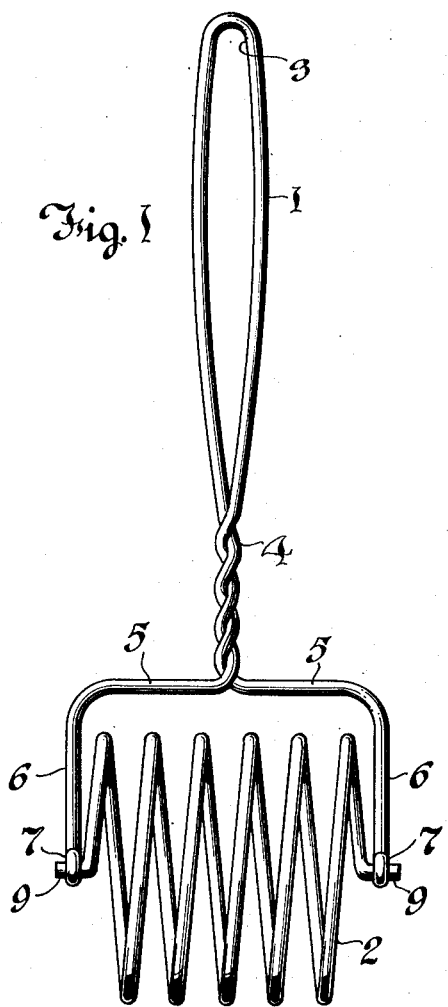
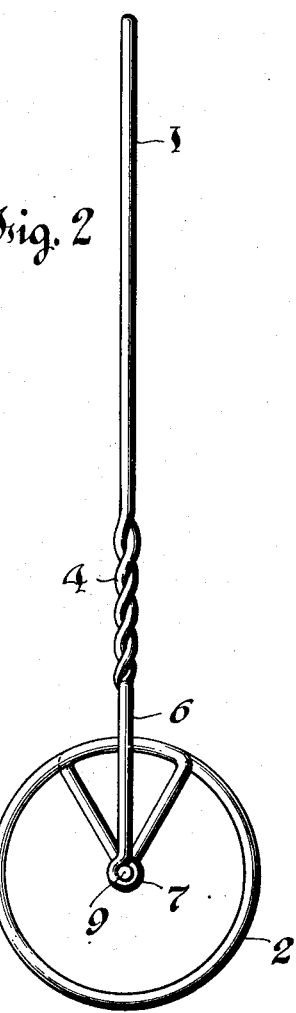
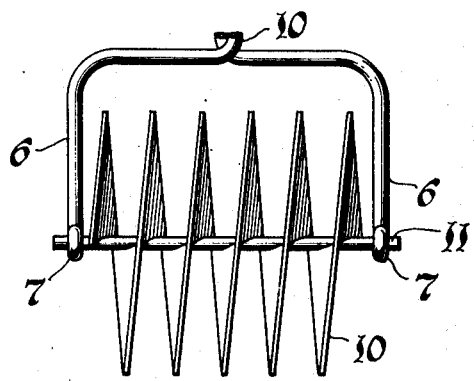
G. W. Doerr
Inventor
BY Louis M. Sanders
Atty.

Patented Mar. 24, 1925.

1,530,716

UNITED STATES PATENT OFFICE.

GEORGE W. DOERR, OF ORANGE, NEW JERSEY.

DOUGH MIXER.

Application filed May 7, 1924. Serial No. 711,541.

*To all whom it may concern:*

Be it known that I, GEORGE W. DOERR, a citizen of the United States, and resident of the city of Orange, county of Essex, and State of New Jersey, have invented a new and useful Improvement in Dough Mixers, set forth in the annexed specification.

My invention relates to devices for mixing or kneading dough, and particularly to that kind used for making pie crust and some kinds of pastry. In the making of dough for pies and some kinds of pastry the best practice has come to be the incorporation of the usual shortening into the mixture by cutting and folding the same therein, rather than by any other method of mixing, as for example kneading. Ordinally a case-knife is used for the purpose, but such practice requires a considerable time in order that the shortening, such as butter or lard may be thoroughly mixed in. I have found that by combining the process of rolling and cutting I am able to accomplish better results in quicker time than by the use of the older methods. The means by which these results are accomplished comprises a short section of heavy wire, helically coiled after the manner of the usually coiled springs, and with the ends inturned to the center and pivoted in a suitable handle. Such a structure constitutes a combined roller and cutter.

In the accompanying drawing forming a part hereof—

Fig. 1 is a plan view of my improved mixer.

Fig. 2 is an edge view of the same.

Fig. 3 is a slight modification.

Similar reference numerals refer to like parts throughout the specification and drawing.

The device consists generally of the handle 1 in which the coiled roller 2 is mounted. The handle is of a suitable length of heavy wire bent at its middle to form a loop 3 and twisted at 4 so as to secure the wire together with the ends outwardly splayed in alignment as at 5 and the ends bent parallel to each other as at 6, 6 with each end formed into an eye as 7, 7.

The roller 2 consists of a suitable length of the wire helically coiled, with the ends of the wire inwardly turned to the center or axis of the coil, then bent outwardly as at 9, 9 to form trunnions which are inserted into the eyes 7, 7.

As thus formed, it will be noted that the coiled roller 2 presents its convolutions in such a way that when rolled over a dough mixture, the convolutions will cut such mixture in parallel lines; after which it may be cross-rolled and folded until the entire mixture becomes homogeneous.

In the modification illustrated in Fig. 3 the handle 1 is of the same form and shape as that above described. The roller 10, however consists of a strip of drawn twisted metal forming a helix with a central shaft 11, which is inserted in the eyes 7, 7.

Either form of the device serves admirably to rapidly mix the dough and to thoroughly incorporate the shortening materials therein.

Changes in form of the device coming within the scope of the appended claims are contemplated.

I claim:

1. In a dough mixer, the combination of a handle having a pair of laterally splayed and forwardly bent arms, with a helically coiled wire roller of cylindrical outline, and having axial trunnions thereon whereby said roller may be rotatably mounted in bearings in said forwardly bent arms.

2. In a dough mixer, the combination of a roller formed from a helically coiled wire of cylindrical outline, having its ends inwardly turned and axially bent to form trunnions, with a bifurcated handle in which said trunnions are mounted.

3. In a dough mixer, the combination of a roller formed from a plurality of convolutions of helically coiled wire having its ends inwardly turned and axially bent to form trunnions, and a handle for said roller formed from a suitable length of wire, doubled and twisted to form a looped handhold, with its ends laterally splayed, forwardly bent and their terminals formed into bearing eyes to receive said trunnions.

4. In a dough mixer, the combination of a handle formed from a suitable length of heavy wire bent at its middle to form a looped handhold, and twisted to unite the parts thereof together, the ends laterally splayed into alignment and then forwardly bent and terminating in bearing eyes, with a cutting roller formed from a suitable length of heavy wire coiled into a helix of a plurality of convolutions having its ends inturned and bent into axial alignment, for insertion into said bearing eyes, whereby said roller may be rolled over a batch of dough with a cutting action thereon.

GEORGE W. DOERR.